(12) United States Patent
Sun et al.

(10) Patent No.: US 8,998,179 B2
(45) Date of Patent: Apr. 7, 2015

(54) AERATION SHIP

(76) Inventors: Shulin Sun, Zoucheng (CN); Jian Sun, Zoucheng (CN)

( * ) Notice: Subject to any disclaimer, the term of this patent is extended or adjusted under 35 U.S.C. 154(b) by 376 days.

(21) Appl. No.: 13/525,349

(22) Filed: Jun. 17, 2012

(65) Prior Publication Data

US 2012/0319310 A1 Dec. 20, 2012

(30) Foreign Application Priority Data

Jun. 17, 2011 (CN) .......................... 2011 1 0162713

(51) Int. Cl.
*C02F 7/00* (2006.01)
*B01F 7/00* (2006.01)
*B01F 7/06* (2006.01)
*B01F 13/00* (2006.01)
*B01F 3/04* (2006.01)
*C02F 1/74* (2006.01)

(52) U.S. Cl.
CPC ............... *C02F 7/00* (2013.01); *B01F 7/00733* (2013.01); *B01F 7/06* (2013.01); *B01F 13/0037* (2013.01); *B01F 3/04539* (2013.01); *B01F 3/04588* (2013.01); *C02F 1/74* (2013.01); *B01F 2003/04546* (2013.01); *B01F 2003/04652* (2013.01); *B01F 2003/04723* (2013.01)

(58) Field of Classification Search
CPC .... B01F 7/00733; B01F 7/06; B01F 13/0037; B01F 3/04539; B01F 3/04588; B01F 2003/04546; B01F 2003/04652; B01F 2003/04723; C02F 7/00; C02F 7/74
USPC ............ 261/120, 30, 83–85, 87; 210/91, 241, 210/242.1, 242.2
See application file for complete search history.

(56) References Cited

U.S. PATENT DOCUMENTS

| | | | | |
|---|---|---|---|---|
| 3,811,662 A * | 5/1974 | Kaelin | ............................ | 261/91 |
| 3,864,441 A * | 2/1975 | Suzuki | ...................... | 261/122.1 |
| 4,723,107 A * | 2/1988 | Schmid | ........................... | 322/35 |
| 5,185,085 A * | 2/1993 | Borgren | ..................... | 210/747.6 |
| 5,354,457 A * | 10/1994 | Becchi | ..................... | 210/170.02 |
| 7,628,924 B2 * | 12/2009 | Ladouceur et al. | ............ | 210/703 |
| 2002/0139756 A1* | 10/2002 | Matsuzaki | ..................... | 210/748 |
| 2004/0195789 A1* | 10/2004 | Christensen | .................... | 280/35 |
| 2010/0109170 A1* | 5/2010 | Sun et al. | ........................ | 261/87 |

* cited by examiner

*Primary Examiner* — Duane Smith
*Assistant Examiner* — Stephen Hobson
(74) *Attorney, Agent, or Firm* — Matthias Scholl P.C.; Matthias Scholl

(57) ABSTRACT

An aeration ship including a ship body, a ship bottom, and an aerator. The aerator includes an air cylinder having an upper section and a lower section. The upper section of the air cylinder is fixed on the ship body, and the lower section of the air cylinder penetrates the ship bottom and extends downwards.

10 Claims, 7 Drawing Sheets

AERATION SHIP

CROSS-REFERENCE TO RELATED APPLICATIONS

Pursuant to 35 U.S.C. §119 and the Paris Convention Treaty, this application claims the benefit of Chinese Patent Application No. 201110162713.4 filed Jun. 17, 2011, the contents of which are incorporated herein by reference.

BACKGROUND OF THE INVENTION

1. Field of the Invention

The invention relates to an aeration ship used in sewage purification and biological treatment for rapidly and effectively increasing oxygen in a deep-water area by aeration for improving the content and saturation of dissolved oxygen in sewage.

2. Description of the Related Art

Methods of treating the organic matters in wastewater by microorganisms have the advantages of less investment, high efficiency, stable operation, low operating cost, good effluent quality, and good sludge settleability. In biological treatment methods, because there is almost no odor, the activated sludge process plays an extremely important role due to its characteristics of shorter processing time and high treatment efficiency. In the activated sludge process, aeration is necessary for supplying sufficient oxygen to sewage, and activated sludge is fully mixed with sewage, and further kept in suspension, so that the oxygen in air is effectively dissolved in sewage.

Conventional aeration equipment mostly adopts a single machine body, and freely moves on water when in use. An aeration ship as shown in FIG. 1 includes an air compressor 206, an air cylinder 204, submersible hollow shaft motors 602, and a propeller 604. A base 6 having a hollow structure is arranged between the air cylinder 204 and the submersible hollow shaft motors 602, and a plurality of openings are formed on the side surface of the base 6 and simultaneously connected with the submersible hollow shaft motors 602. By adopting the structure, aeration can be carried out in a plurality of directions at the same time, and the aeration efficiency is improved, however, the aerator freely navigates on water with uncontrollable aeration direction, thus it's not suitable for uniform aeration on water on a large scale.

Conventional aerators generally have a fixed aerator and a movable aerator, and in both the fixed aerator and movable aerator, air is conveyed to sewage through an air guide tube, and the introduced air is mixed with sewage through a sewage mixing device. The length of the air guide pipe is fixed, thus the aerator is only suitable for working near a pool with a smooth water bottom, and for the waters in a natural environment such as lakes and rivers required to be treated, due to the different depths of the water bottom, when the aerator with the air guide tube with fixed length works, the sewage in the deep-water area fails to be mixed, and the aerator fails to move in the shallow-water area, therefore, the aeration efficiency and quality are greatly limited.

Conventional aerators can be used for sewage aeration, however, for those seriously polluted waters, for example, the water in an earthquake-stricken area, besides the normal aeration, disinfection is also needed or chemical substances are required. However, the disinfection fails to be carried out in the polluted waters through the aerator in the prior art.

SUMMARY OF THE INVENTION

In view of the above-described problems, it is one objective of the invention to provide an aeration ship provided with controllable direction and free navigation and capable of stably and evenly performing large-area aeration. In the aeration ship, the underwater penetration of the aerator can be adjusted according to different water depths, the aeration depth is adjusted, and the disinfection is carried out during the aeration, or chemical substances are added to sewage.

To achieve the above objective, in accordance with one embodiment of the invention, there is provided an aeration ship comprising a ship body, a ship bottom, and an aerator, wherein the aerator comprises an air cylinder having an upper section and a lower section, the upper section of the air cylinder is fixed on the ship body, and the lower section of the air cylinder penetrates the ship bottom and extends downwards.

The moving direction of the ship body of the aeration ship is controllable and thus stable large-area aeration in large-scale water can be performed. Thus, the aeration efficiency is improved.

In a class of this embodiment, the aerator is a submerged aerator.

In a class of this embodiment, the aerator comprises an air compressor, and an output port of the air compressor is connected with the upper part of the air cylinder.

In a class of this embodiment, the aerator comprises a compressed air pipe, and the output port of the air compressor is connected with the upper part of the air cylinder via the compressed air pipe.

The air compressor is connected with the air cylinder via the compressed air pipe, and the compressed air pipe is controllable in length and shape, thus the air compressor is more flexibly placed.

In a class of this embodiment, the aerator comprises a submersible hollow shaft motor, a propeller, and a base; the air cylinder is connected with the submersible hollow shaft motor through the base, and the propeller is coaxially connected with the submersible hollow shaft motor.

In a class of this embodiment, the base is a multidirectional base, an opening at an upper part of the base is connected with the air cylinder, and an opening on a side surface of the base is connected with the submersible hollow shaft motor.

In a class of this embodiment, three uniformly distributed openings are formed on the side surface of the base.

The multidirectional base is used as a channel for uniformly distributing a compressed air source, and air is simultaneously sprayed and diffused around the aerator through shaft holes of a hollow transmission shaft of the submersible hollow shaft motor, so that the aeration is more uniform and more stable, and the aeration efficiency is improved.

In a class of this embodiment, the aeration ship further comprises an aeration system lifting device for controlling the ascending or descending of the air cylinder.

In a class of this embodiment, the aeration system lifting device comprises an electric generator, a hydraulic station, a hydraulic pipe, a lifting oil cylinder, and a piston; the lifting oil cylinder is fixed on the ship body, the electric generator drives the hydraulic station to work, the hydraulic station is connected with the lifting oil cylinder via the hydraulic pipe, the air cylinder penetrates the inside of the lifting oil cylinder, the piston is arranged between an outer wall of the air cylinder and an inner wall of the lifting oil cylinder, and oil is filled between the outer wall of the air cylinder and the inner wall of the lifting oil cylinder.

In a class of this embodiment, the aeration system lifting device comprises a lead screw, a lifter, a lifting handle, a protective sleeve of the lead screw, a lifting guide pipe, and a connecting plate; the lifting guide pipe and the protective sleeve of the lead screw are fixed on the ship body, the air cylinder penetrates the inside of the lifting guide pipe, the connecting plate is used for connecting the upper end of the air cylinder and the upper end of the lead screw, the lead screw penetrates the inside of the protective sleeve of the lead screw via the lifter, and the lifting handle drives the lead screw to ascend or descend through a worm and gear system in the lifter.

Because the lifting mechanism is used for controlling the ascending or descending of the air cylinder, the underwater penetration of the aerator is adjusted according to different water depths, and the aeration depth is adjusted.

In a class of this embodiment, the aeration ship further comprises a disinfectant generator arranged in the ship body, and an output port of the disinfectant generator is communicated with the upper part of the air cylinder.

In a class of this embodiment, the aeration ship further comprises a three-way pipe and a disinfectant delivery pipe, an output port of the three-way pipe is communicated with the upper part of the air cylinder, a first input port of the three-way pipe is communicated with the air compressor through the compressed air pipe, and a second input port of the three-way pipe is communicated with the disinfectant generator through the disinfectant delivery pipe.

The disinfectant generator is additionally arranged, thus the disinfection is carried out during the aeration, or chemical substances are added to sewage.

The term "is connected with" as used herein respective any embodiment of the invention encompasses the terms "is directly connected to" and "is directly connected with."

Advantages of the invention are summarized below. The aerator is combined with the ship, thus when the aeration ship works, the aeration is stable, the direction is controllable, the large-area aeration can be performed, and the aeration efficiency is improved. Meanwhile, through controlling the ascending or descending of the air cylinder, the underwater penetration of the aerator is adjusted according to different water depths, and the aeration depth is adjusted, so that the aeration can be carried out in a broader and more complicated water. In addition, the sterilizing device is also arranged in the aeration ship, so that disinfectant or chemical substances can be put in water during the aeration, and sewage is disinfected.

DETAILED DESCRIPTION OF THE EMBODIMENTS

Figure 2:
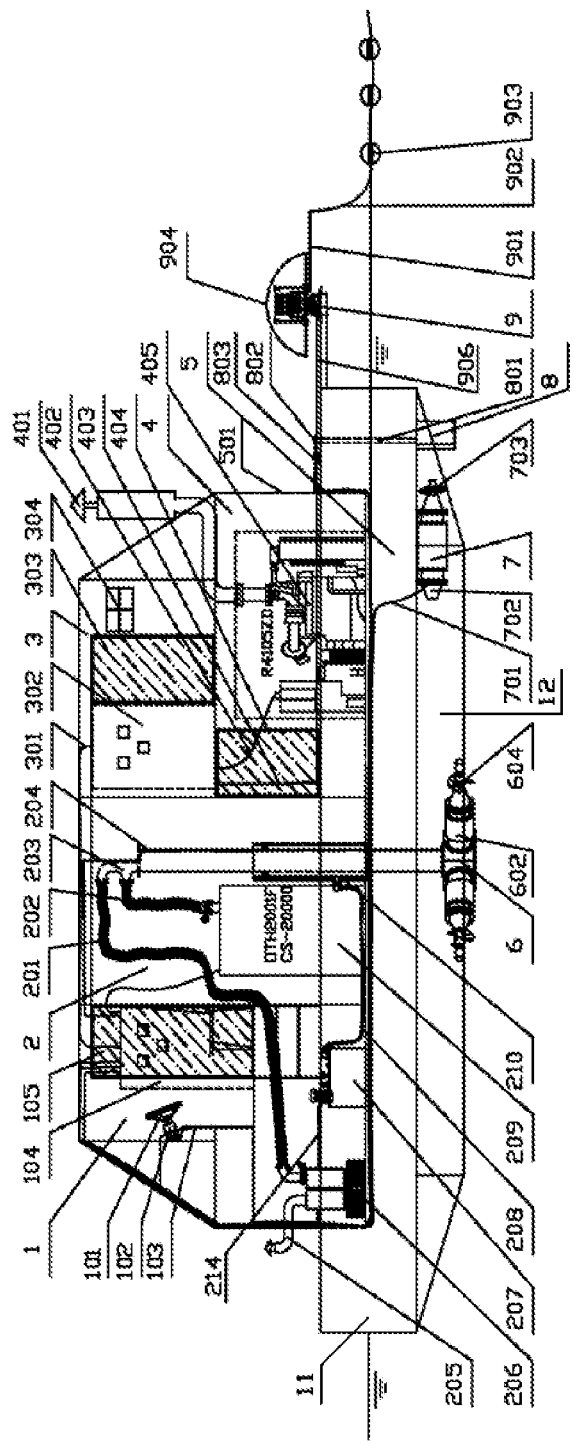
FIG. 2 is a front view of an aeration ship in accordance with one embodiment of the invention.
Figure 3:
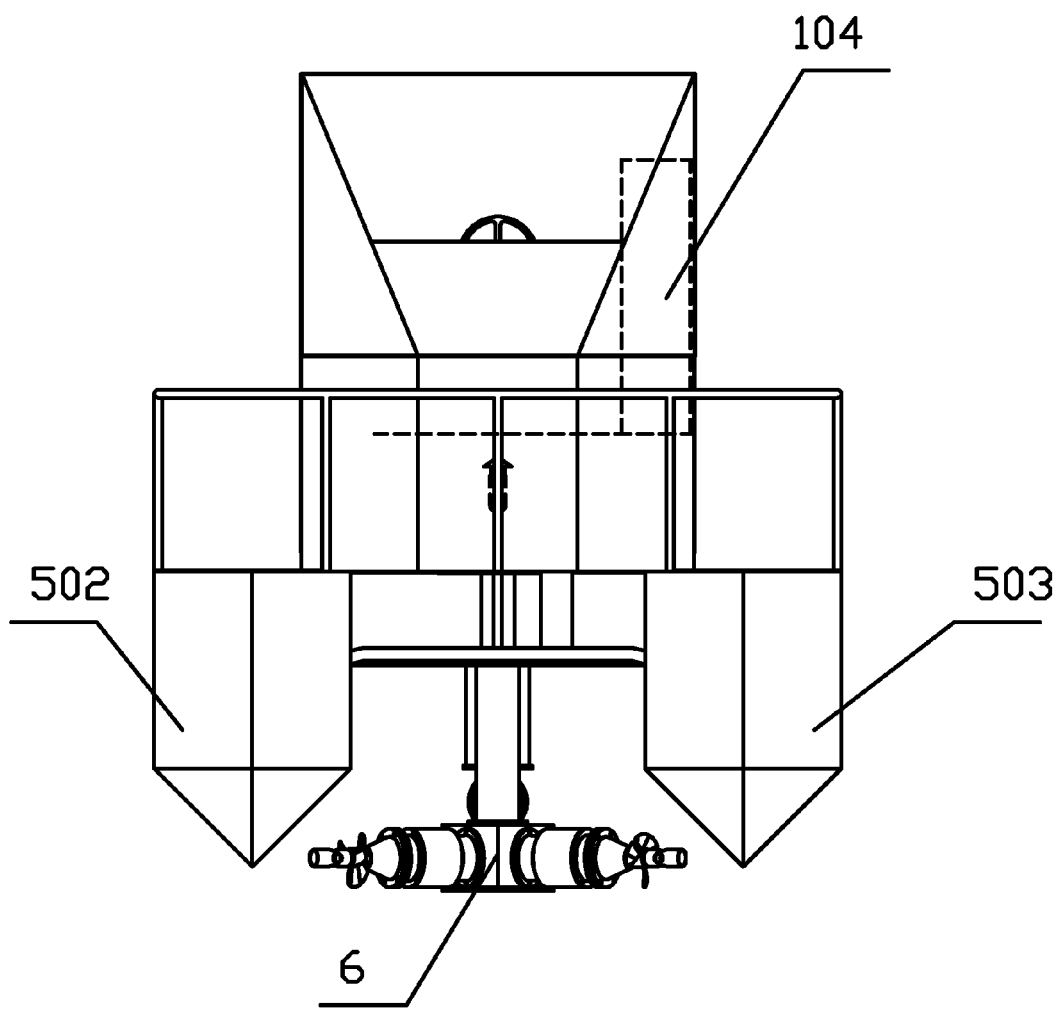
FIG. 3 is a left view of an aeration ship in accordance with one embodiment of the invention.
Figure 4:
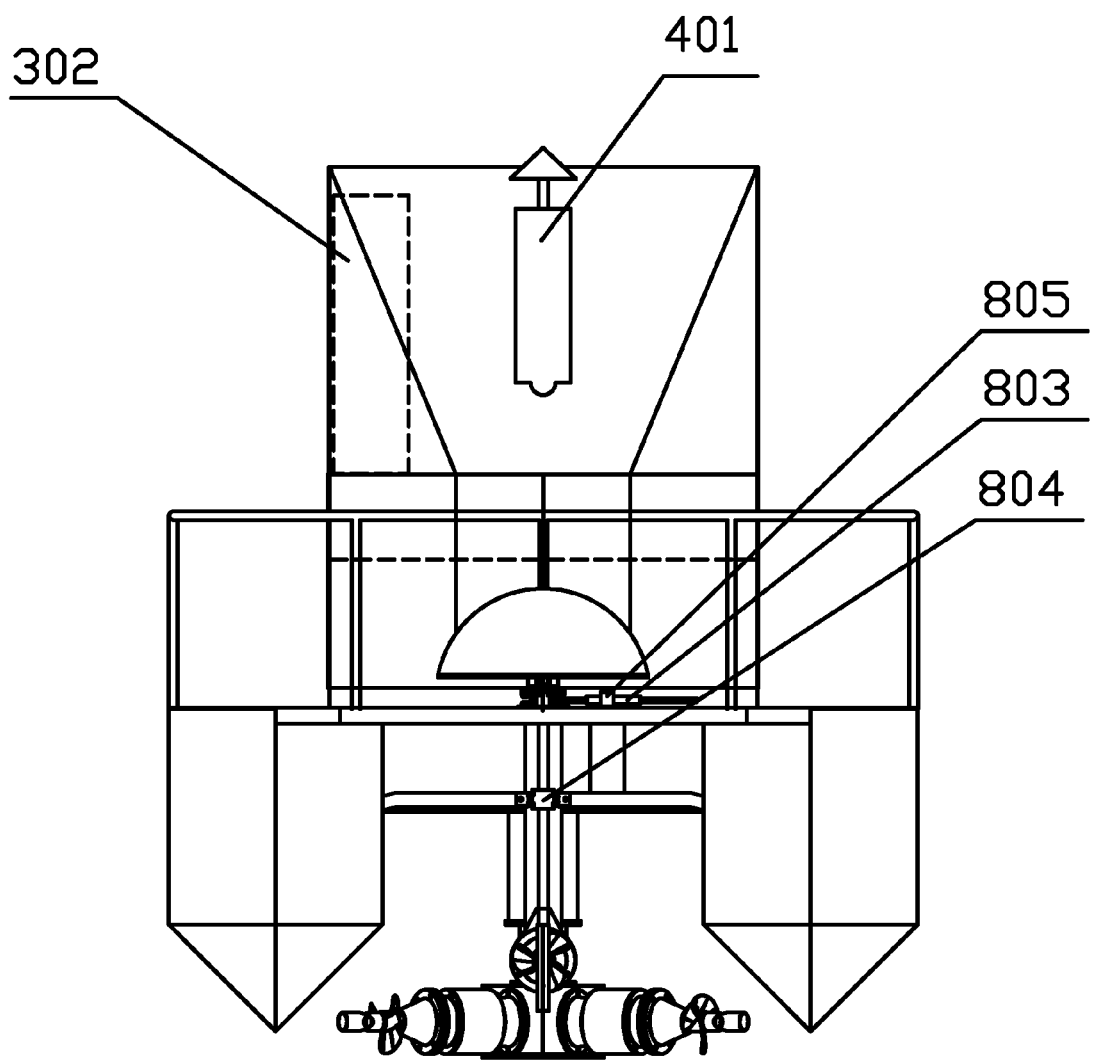
FIG. 4 is a right view of an aeration ship in accordance with one embodiment of the invention.

An aeration ship as shown in FIGS. 2, 3, and 4 comprises a ship body 11, a ship bottom 12, a pilot instrument cabin 1, an integrated cabin 2, a power distribution cabin 3, a power cabin 4, a left ship body 502, and a right ship body 503. A steering wheel 101, a manual hydraulic pump 102, a steering gear oil pipe 103, a frequency-conversion control cabinet 104, and a cockpit door 105 are arranged in the pilot instrument cabin 1; an air compressor 206, a hydraulic station 207, a disinfectant generator 209, an air cylinder 204, and a lifting oil cylinder 210 are arranged in the integrated cabin 2; a power distribution control cabinet 302, a power distribution cabin door 303, and a window 304 are arranged in the power distribution cabin 3; an electric generator 405 and a power cabin door 404 are arranged in the power cabin 4. An air inlet of the air compressor 206 arranged in the ship body 11 is introduced outside the cabin via an air inlet pipe 205, and an air outlet is connected with one end of a three-way pipe 203 positioned at the upper part of the air cylinder 204 through an compressed air pipe 201. An output port of the disinfectant generator 209 is connected with another end of the three-way pipe 203 positioned at the upper part of the air cylinder 204 through a disinfectant delivery pipe 202.

As shown in FIGS. 3 and 4, the ship in the example is a double-bottom ship, the aerator is installed between the two ship bottoms at the bottom of the ship, and the aerator sinks in water for aeration. For any ship (e.g., a single-bottom ship) with the similar structure, as long as one part of the aerator is fixed on the ship, and the other part sinks in water for work, all should fall within the protection range of the invention.

Figure 1:
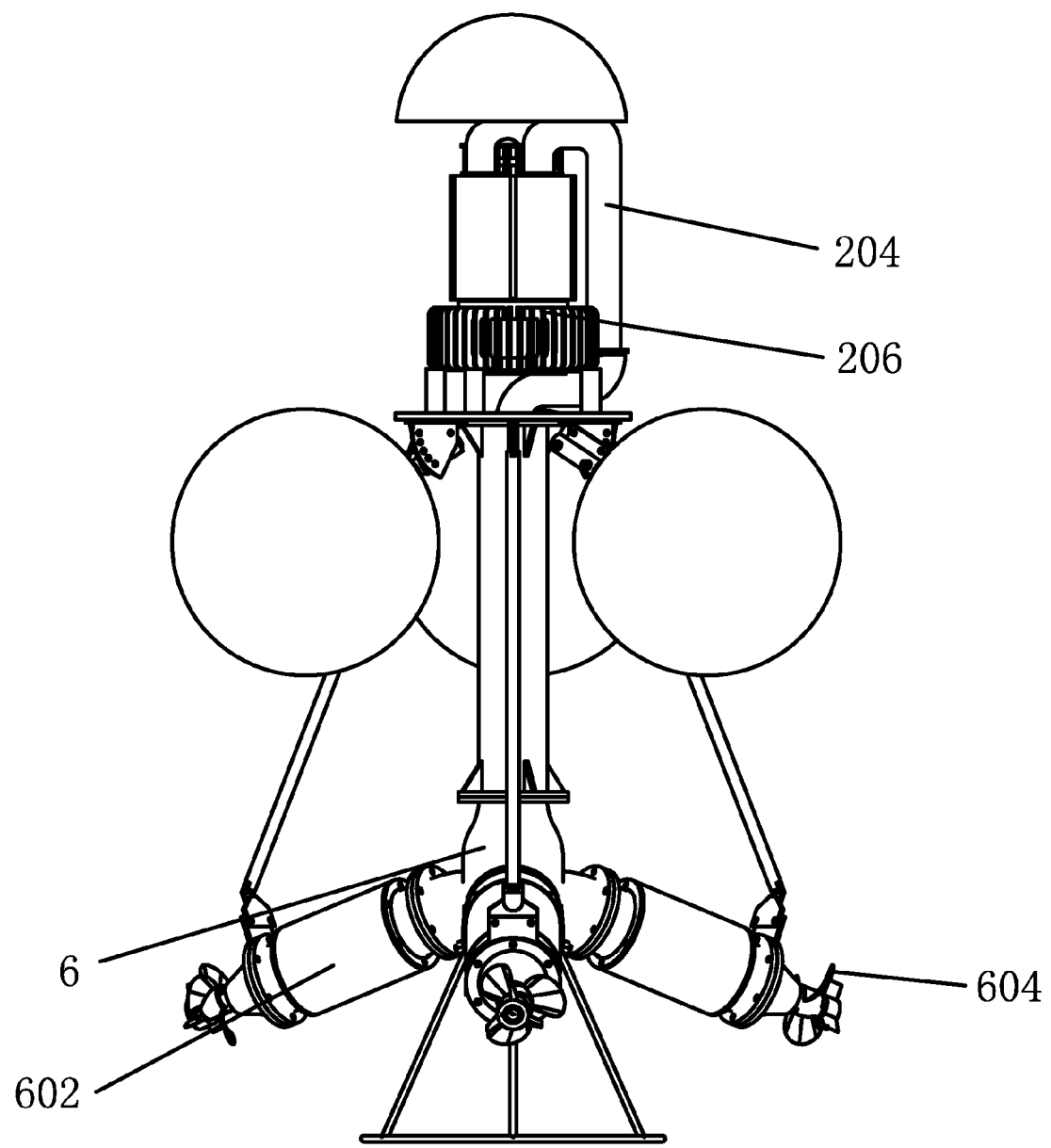
FIG. 1 is a front view of a multifunctional submerged aerator in the prior art.

In combination with FIG. 1, the base 6 is a multifunctional base and connected with the bottom of the air cylinder 204, an opening at the upper part of the base 6 is connected with the air cylinder 204, and openings on the side surface of the base 6 are connected with submersible hollow shaft motors 602 respectively. A propeller 604 is coaxially connected with each of the submersible hollow shaft motors 602. A hollow structure is adopted inside the base 6, the openings on the side surface of the base 6 are used as the channel for uniformly distributing a compressed air source, and the number of the openings can be 2-4 or more. The air pressurized through the air compressor 206 flows through the air cylinder 204 via the three-way pipe 203, and then is simultaneously sprayed and diffused around through shaft holes of hollow transmission shafts of the submersible hollow shaft motors 602 connected with the openings on the side surface of the base 6 respectively, so that the uniform aeration is carried out in sewage, the aeration is more uniform and more stable, and the serration efficiency is improved.

The aeration ship further comprises an aeration system lifting device, a disinfectant generator, a ship body propulsion apparatus, and a ship body steering device.

Figure 5:
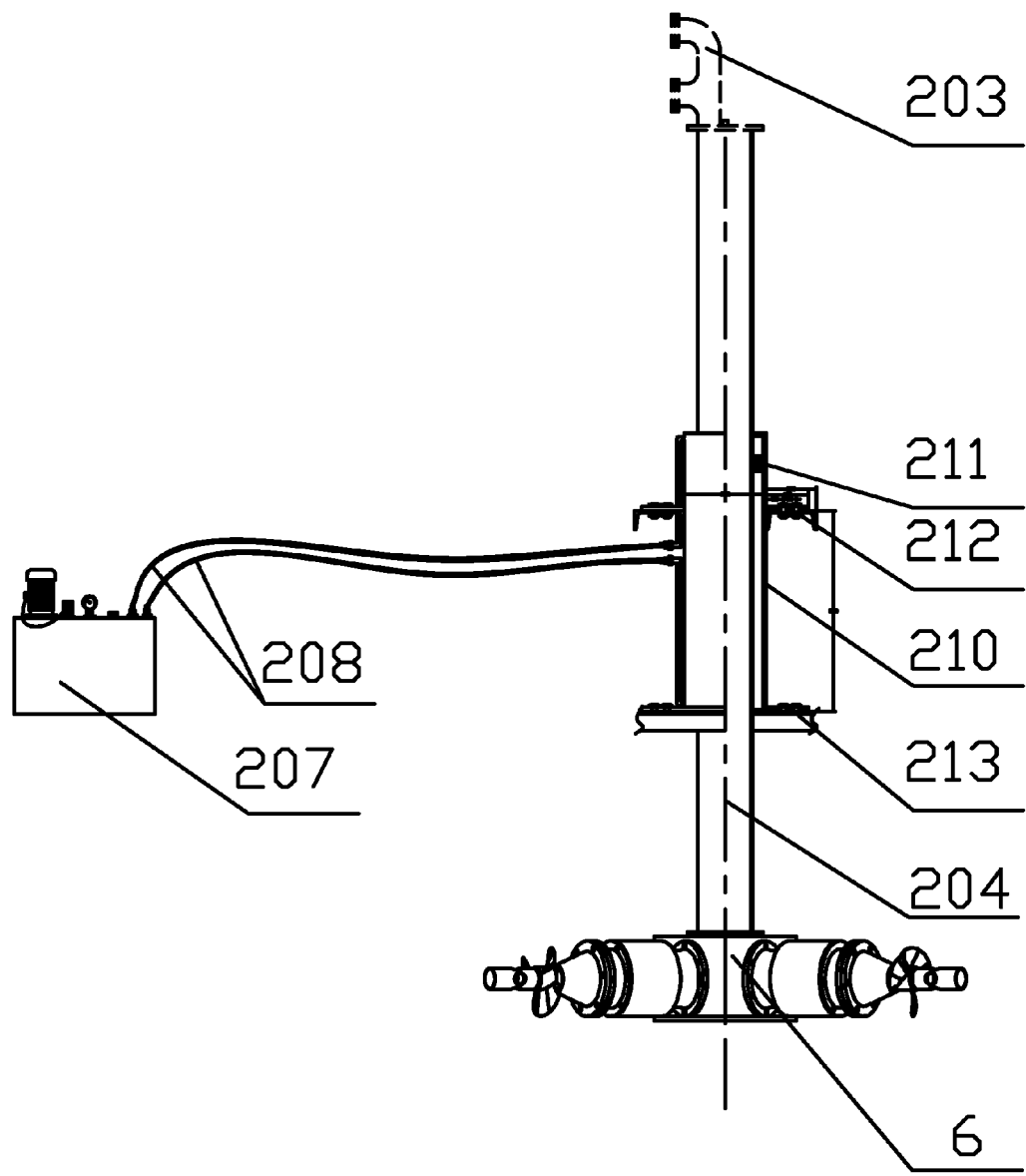
FIG. 5 is a schematic diagram of an aeration system lifting device of a first example of the invention.

In a first embodiment of the aeration system lifting device, as shown in FIG. 5, the aeration system lifting device comprises the hydraulic station 207, hydraulic pipes 208, the lifting oil cylinder 210, a piston 211, an upper connecting plate 212, and a lower connecting plate 213. The electric generator 405 drives the hydraulic station 207 to work. The hydraulic station 207 is connected with the lifting oil cylinder 210 through two hydraulic pipes 208. The upper part of the air cylinder 204 is connected with the three-way pipe 203, and the lower part of the air cylinder 204 is connected with the base 6. The air cylinder 204 penetrates the inside of the lifting oil cylinder 210, and oil is filled between the outer wall of the air cylinder 204 and the inner wall of the lifting oil cylinder 210. The piston 211 is arranged between the outer wall of the air cylinder 204 and the inner wall of the lifting oil cylinder 210. The upper connecting plate 212 is arranged at the upper end of the outer wall of the lifting oil cylinder 210, and the lower connecting plate 213 is arranged at the lower end of the outer wall of the lifting oil cylinder 210, so that the lifting oil cylinder 210 is fixed on the ship body 11. The hydraulic station 207 drives the hydraulic oil in the hydraulic pipes 208 to enter the lifting oil cylinder 210, and the piston 211 is further pushed to drive the air cylinder 204 to ascend or descend, so as to achieve the purpose of regulating and controlling the aeration depth.

Figure 6:
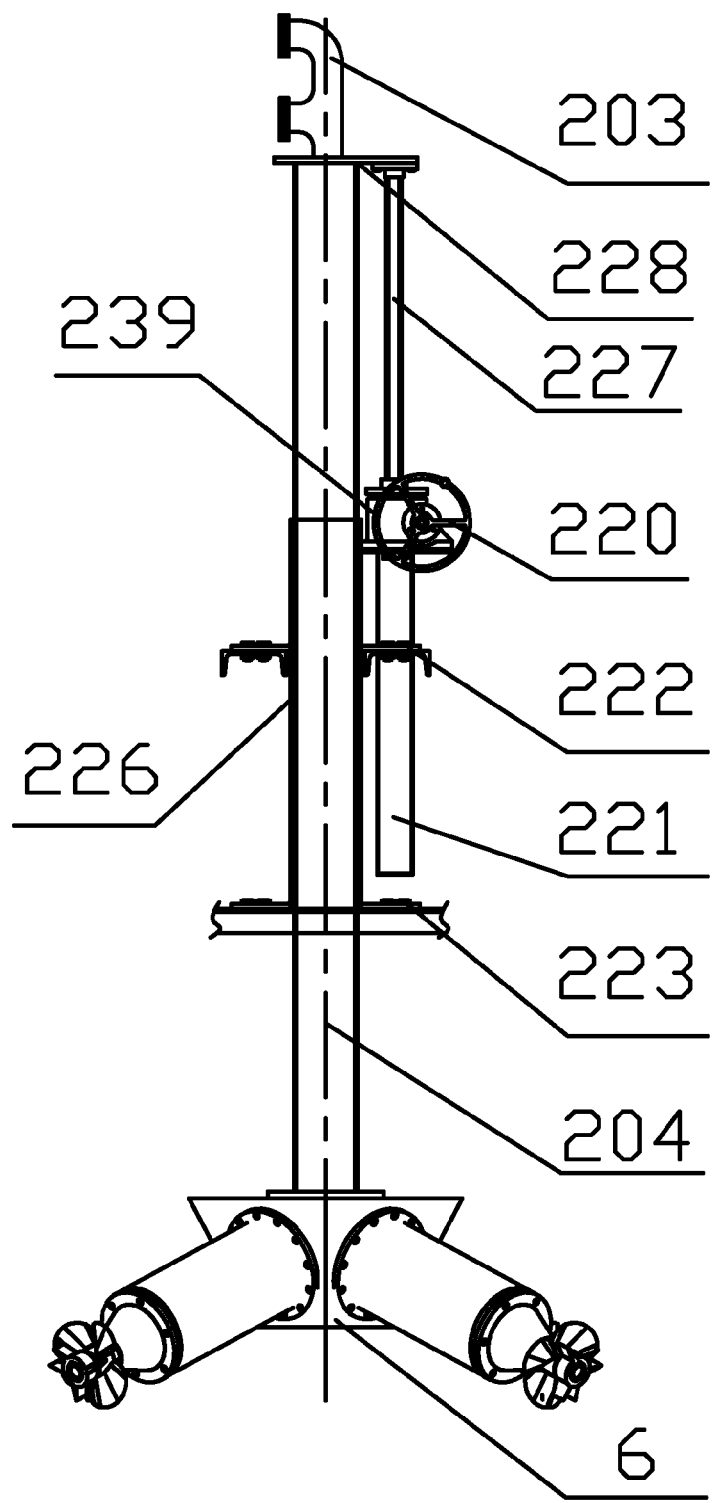
FIG. 6 is a schematic diagram of an aeration system lifting device of a second example of the invention.

In a second embodiment of the aeration system lifting device, as shown in FIG. 6, the aeration system lifting device comprises a lead screw 227, a lifter 239, a lifting handle 220, a protective sleeve 221 of the lead screw, a lifting guide pipe 226, an upper connecting plate 222, a lower connecting plate 223, and a connecting plate 228. The air cylinder 204 penetrates the inside of the lifting guide pipe 226. The upper connecting plate 222 is arranged at the upper end of the outer wall of the lifting guide pipe 226. The lower connecting plate 223 is arranged at the lower end of the outer wall of the lifting guide pipe 226. The connecting plate 228 is used for connecting the upper end of the air cylinder 204 and the upper end of the lead screw 227, and the protective sleeve 221 of the lead screw is fixed through the upper connecting plate 222, so that both the lifting guide pipe 226 and the protective sleeve 221 of the lead screw are fixed on the ship body 11. The lead screw 227 penetrates the inside of the protective sleeve 221 of the lead screw, the lifting handle 220 drives the lead screw 227 to ascend or descend through a worm and gear system (not shown in the figure) in the lifter 239, and the lead screw 227 drives the air cylinder 204 to ascend or descend, so as to achieve the purpose of regulating and controlling the aeration depth.

Certainly, other similar devices in the prior art can be installed on the aeration ship for controlling the ascending or descending of the aerator, so all these should fall within the protection range of the invention.

As for the disinfectant generator, as shown in FIG. 2, the air inlet of the air compressor 206 is introduced outside the cabin via the air inlet pipe 205, and the air outlet is connected with one end of the three-way pipe 203 positioned at the upper part of the air cylinder 204 through the compressed air pipe 201. The output port of the disinfectant generator 209 is connected with another end of the three-way pipe 203 positioned at the upper part of the air cylinder 204 through the disinfectant delivery pipe 202. The disinfectant generator is additionally arranged, thus the disinfection is carried out during the aeration, or chemical substances are added to sewage.

As shown in FIG. 2, the ship body propulsion apparatus comprises the electric generator 405, a submergible hollow shaft propulsion motor 7 and a propulsion propeller 703. The electric generator 405 is installed in the power cabin 4. The submergible hollow shaft propulsion motor 7 is hung between the left ship body 502 and the right ship body 503, and a cable 701 of the submergible hollow shaft propulsion motor 7 is connected with the frequency-conversion control cabinet 104 in the pilot instrument cabin 1. The power distribution control cabinet 302 in the power distribution cabin 3 is connected with the frequency-conversion control cabinet 104 through an output cable 301, and the power distribution control cabinet 302 is connected with the electric generator 405 in the power cabin 4 through a generator output cable 402; a water inlet hole 702 is formed at the front part of the submergible hollow shaft propulsion motor 7, and the propulsion propeller 703 is arranged at the rear part of the submergible hollow shaft propulsion motor 7 and coaxially connected with the submergible hollow shaft propulsion motor 7.

Figure 7:
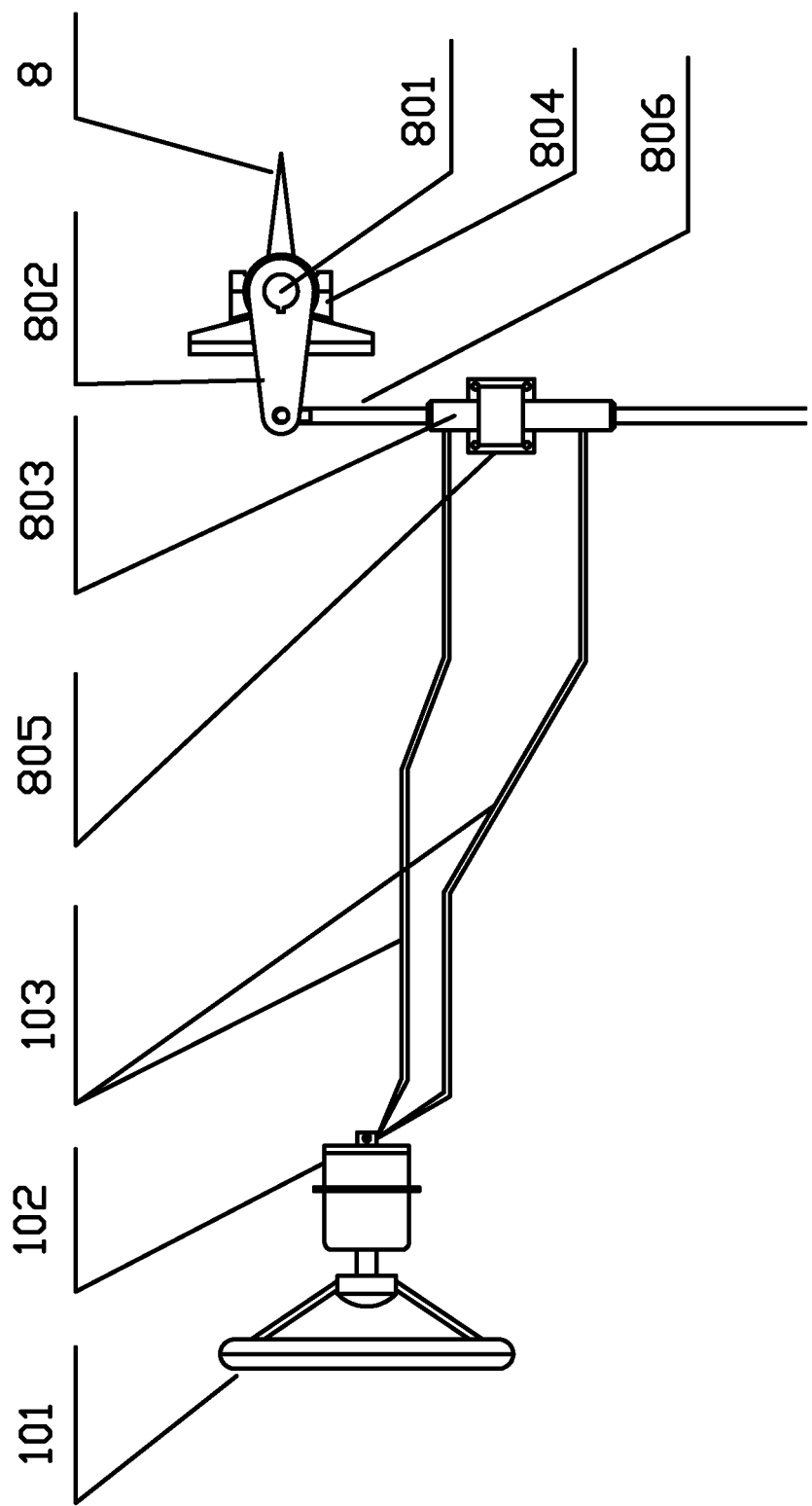
FIG. 7 is a schematic diagram of a steering device of an aeration ship in accordance with one embodiment of the invention.

As shown in FIG. 7, the ship body steering device comprises a steering wheel 101, a manual hydraulic pump 102, steering gear oil pipes 103, a steering gear oil cylinder 803, an oil cylinder support 805, a rudder stock 801, a rudder stock bearing bracket 804, a tiller 802, and a rudder blade 8. The steering wheel 101 is connected with the manual hydraulic pump 102. The steering gear oil cylinder 803 is connected with the manual hydraulic pump 102 through the two steering gear oil pipes 103. The steering gear oil cylinder 803 is positioned on the oil cylinder support 805. The upper part of the steering gear oil cylinder 803 is connected with one end of the tiller 802 through a piston rod 806, and the other end of the tiller 802 is connected with the upper end of the rudder stock 801. The rudder stock 801 penetrates the rudder stock bearing bracket 804 to connect with the rudder blade 8.

The steering gear adopts a reciprocating steering mechanism, and mainly comprises the steering gear oil cylinder 803 (fixed on the oil cylinder support 805) and the piston rod 806 (capable of making reciprocating motion in the steering gear oil cylinder 803). The steering wheel 101 manually rotates left or right to drive the manual hydraulic pump 102. Oil is forced into the steering gear oil cylinder 803 by the manual hydraulic pump 102 via the steering gear oil pipe 103. The piston rod 806 moves left or right under the action of oil pressure and is connected with one end of the tiller 802 through a movable connector at the top end of the piston rod 806. The other end of the tiller 802 is fixed at the upper end of the rudder stock 801 through a key. The deflecting direction of the rudder blade 8 can be changed through the reciprocating motion of the piston rod 806, so that the direction of travel of the ship is changed.

In the aeration ship, as shown in FIG. 2, an electric slip ring 9 is arranged at the tail part of the ship body 11, a rain shield 904 is arranged at the upper part of the electric slip ring 9, and the electric slip ring 9 is connected with an external input cable 902 and an external output cable 906 respectively. The external input cable 902 penetrates via a cable duct tube 901 and is connected with the electric slip ring 9. A plurality of floating balls 903 are tied at the position where the external input cable 902 is positioned on water. The external output cable 906 is also connected with the power distribution control cabinet 302.

The hydraulic station 207 is connected with the frequency-conversion control cabinet 104 through a hydraulic station cable 214. One end of the power distribution control cabinet 302 is connected with the electric generator 405 through a generator output cable 402, and the other end of the power distribution control cabinet 302 is connected with the frequency-conversion control cabinet 104 through an output cable 301, and further connected with the air compressor 206 and the disinfectant generator 209 respectively. Two frequency converters are arranged in the frequency-conversion control cabinet 104 and connected with the submergible hollow shaft propulsion motor 7 and the submergible hollow shaft motors 602 through cables.

When the aeration ship works, the air compressor 206 is driven by the power distribution control cabinet 302 to output compressed air under the action of electric power of the electric generator 405, the disinfectant generator 209 is also driven to spray disinfectant, and meanwhile, the electric power is input to the frequency-conversion control cabinet 104 through an electrical cabinet and drives the submergible hollow shaft propulsion motor 7 connected with the frequency-conversion control cabinet 104 to work. Thus, the motor transmission shaft rotates to drive the propulsion propeller 703 to rotate, so as to push the ship body to move forwards. The electric power of the electric generator 405 drives the hydraulic station 207 to work or drives the aerator lifting device to work through the lifting handle 220.

In conclusion, the application of the ship avoids the inconvenience caused by installing plurality of aerators in the large-area water, and the movable aeration can be carried out according to the specific anoxic zone and demand of water body. Meanwhile, the seriously polluted water can be disinfected during the aeration or chemicals are put in the seriously polluted water.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An aeration ship, comprising:
a) a ship body;
b) a ship bottom; and
c) an aerator comprising an air cylinder having an upper section and a lower section;
wherein:
the upper section of the air cylinder is fixed on the ship body;
the lower section of the air cylinder penetrates the ship bottom and extends downwards;
the aeration ship further comprises an aeration system lifting device for controlling the ascending or descending of the air cylinder;
the aeration system lifting device comprises an electric generator, a hydraulic station, a hydraulic pipe, a lifting oil cylinder, and a piston;
the lifting oil cylinder is fixed on the ship body;
the electric generator drives the hydraulic station to work;
the hydraulic station is connected with the lifting oil cylinder via the hydraulic pipe;
the air cylinder penetrates the inside of the lifting oil cylinder;
the piston is arranged between an outer wall of the air cylinder and an inner wall of the lifting oil cylinder; and
oil is filled between the outer wall of the air cylinder and the inner wall of the lifting oil cylinder.

2. An aeration ship, comprising:
a) a ship body;
b) a ship bottom; and
c) an aerator comprising an air cylinder having an upper section and a lower section;
wherein:
the upper section of the air cylinder is fixed on the ship body;
the lower section of the air cylinder penetrates the ship bottom and extends downwards;
the aerator further comprises a submersible hollow shaft motor, a propeller, and a base;
the air cylinder is connected with the submersible hollow shaft motor through the base;
the propeller is coaxially connected with the submersible hollow shaft motor;
the base is a multidirectional base, an opening at an upper part of the base is connected with the air cylinder, and an opening on a side surface of the base is connected with the submersible hollow shaft motor;
three uniformly distributed openings are formed on the side surface of the base;
the aeration ship further comprises an aeration system lifting device for controlling the ascending or descending of the air cylinder;
the aeration system lifting device comprises an electric generator, a hydraulic station, a hydraulic pipe, a lifting oil cylinder, and a piston;
the lifting oil cylinder is fixed on the ship body;
the electric generator drives the hydraulic station to work;
the hydraulic station is connected with the lifting oil cylinder via the hydraulic pipe;
the air cylinder penetrates the inside of the lifting oil cylinder;
the piston is arranged between an outer wall of the air cylinder and an inner wall of the lifting oil cylinder; and
oil is filled between the outer wall of the air cylinder and the inner wall of the lifting oil cylinder.

3. An aeration ship, comprising:
a) a ship body;
b) a ship bottom; and
c) an aerator comprising an air cylinder having an upper section and a lower section;
wherein:
the upper section of the air cylinder is fixed on the ship body;
the lower section of the air cylinder penetrates the ship bottom and extends downwards;
the aeration ship further comprises an aeration system lifting device for controlling the ascending or descending of the air cylinder;
the aeration system lifting device comprises a lead screw, a lifter, a lifting handle, a protective sleeve of the lead screw, a lifting guide pipe, and a connecting plate;
the lifting guide pipe and the protective sleeve of the lead screw are fixed on the ship body;
the air cylinder penetrates the inside of the lifting guide pipe;
the connecting plate is used for connecting the upper end of the air cylinder and the upper end of the lead screw;
the lead screw penetrates the inside of the protective sleeve of the lead screw via the lifter; and
the lifting handle drives the lead screw to ascend or descend through a worm and gear system in the lifter.

4. An aeration ship, comprising:
a) a ship body;
b) a ship bottom; and
c) an aerator comprising an air cylinder having an upper section and a lower section;
wherein:
the upper section of the air cylinder is fixed on the ship body;
the lower section of the air cylinder penetrates the ship bottom and extends downwards;
the aerator further comprises a submersible hollow shaft motor, a propeller, and a base;
the air cylinder is connected with the submersible hollow shaft motor through the base;
the propeller is coaxially connected with the submersible hollow shaft motor;
the base is a multidirectional base, an opening at an upper part of the base is connected with the air cylinder, and an opening on a side surface of the base is connected with the submersible hollow shaft motor;
three uniformly distributed openings are formed on the side surface of the base;
the aeration ship further comprises an aeration system lifting device for controlling the ascending or descending of the air cylinder;
the aeration system lifting device comprises a lead screw, a lifter, a lifting handle, a protective sleeve of the lead screw, a lifting guide pipe, and a connecting plate;
the lifting guide pipe and the protective sleeve of the lead screw are fixed on the ship body;
the air cylinder penetrates the inside of the lifting guide pipe;

the connecting plate is used for connecting the upper end of the air cylinder and the upper end of the lead screw;

the lead screw penetrates the inside of the protective sleeve of the lead screw via the lifter; and the lifting handle drives the lead screw to ascend or descend through a worm and gear system in the lifter.

5. An aeration ship, comprising:

a) a ship body;

b) a ship bottom; and c) an aerator comprising an air cylinder having an upper section and a lower section;

wherein:

the upper section of the air cylinder is fixed on the ship body;

the lower section of the air cylinder penetrates the ship bottom and extends downwards;

the aerator further comprises an air compressor, and an output port of the air compressor is connected with an upper part of the air cylinder;

the aerator further comprises a compressed air pipe, and the output port of the air compressor is connected with the upper part of the air cylinder via the compressed air pipe; and the aeration ship further comprises a disinfectant generator arranged in the ship body, wherein an output port of the disinfectant generator is communicated with the upper part of the air cylinder.

6. The aeration ship of claim 2, further comprising a disinfectant generator arranged in the ship body, wherein an output port of the disinfectant generator is communicated with the upper part of the air cylinder.

7. The aeration ship of claim 4, further comprising a disinfectant generator arranged in the ship body, wherein an output port of the disinfectant generator is communicated with the upper part of the air cylinder.

8. The aeration ship of claim 5, further comprising a three-way pipe and a disinfectant delivery pipe, wherein an output port of the three-way pipe is communicated with the upper part of the air cylinder;

a first input port of the three-way pipe is communicated with the air compressor through the compressed air pipe; and a second input port of the three-way pipe is communicated with the disinfectant generator through the disinfectant delivery pipe.

9. The aeration ship of claim 6, further comprising a three-way pipe and a disinfectant delivery pipe, wherein an output port of the three-way pipe is communicated with the upper part of the air cylinder;

a first input port of the three-way pipe is communicated with the air compressor through the compressed air pipe; and a second input port of the three-way pipe is communicated with the disinfectant generator through the disinfectant delivery pipe.

10. The aeration ship of claim 7, further comprising a three-way pipe and a disinfectant delivery pipe, wherein an output port of the three-way pipe is communicated with the upper part of the air cylinder;

a first input port of the three-way pipe is communicated with the air compressor through the compressed air pipe; and a second input port of the three-way pipe is communicated with the disinfectant generator through the disinfectant delivery pipe.

* * * * *